US012167501B2

(12) United States Patent
Matsugi et al.

(10) Patent No.: US 12,167,501 B2
(45) Date of Patent: Dec. 10, 2024

(54) SETTING APPARATUS

(71) Applicant: Honda Motor Co., Ltd., Tokyo (JP)

(72) Inventors: Yoshihiro Matsugi, Tokyo (JP); Kazune Furudo, Tokyo (JP); Naoki Shibata, Tokyo (JP); Naoki Kikuchi, Tokyo (JP); Shigeki Takahashi, Tokyo (JP); Yuki Matsuura, Tokyo (JP); Shogo Usui, Tokyo (JP); Koji Hashimoto, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 394 days.

(21) Appl. No.: 17/704,220

(22) Filed: Mar. 25, 2022

(65) Prior Publication Data

US 2022/0312191 A1 Sep. 29, 2022

(30) Foreign Application Priority Data

Mar. 29, 2021 (JP) ................. 2021-054703

(51) Int. Cl.
*H04W 8/24* (2009.01)
*H04W 4/021* (2018.01)
*H04W 4/40* (2018.01)

(52) U.S. Cl.
CPC ............. *H04W 8/24* (2013.01); *H04W 4/021* (2013.01)

(58) Field of Classification Search
CPC ......... H04W 4/02; H04W 4/021; H04W 4/30; H04W 4/40; H04W 8/18; H04W 8/24; H04W 12/00; H04W 12/06; G06F 3/0484; G06F 3/04842; B60K 35/00; B60K 35/10; B60K 35/22; B60R 16/307
See application file for complete search history.

(56) References Cited

U.S. PATENT DOCUMENTS

| | | | | |
|---|---|---|---|---|
| 10,534,899 B2 * | 1/2020 | Adams | ................ | H04W 12/06 |
| 10,880,686 B1 * | 12/2020 | Smith | ................ | H04W 4/023 |
| 11,209,961 B2 * | 12/2021 | Pope | .................. | G06F 3/0481 |
| 11,372,936 B2 * | 6/2022 | Ricci | ................ | G06F 3/04886 |
| 11,807,097 B2 * | 11/2023 | Oe | ...................... | B60K 35/00 |

(Continued)

FOREIGN PATENT DOCUMENTS

| | | |
|---|---|---|
| JP | 2004330891 A | 11/2004 |
| JP | 2014133537 A | 7/2014 |
| JP | 2015088837 A | 5/2015 |

OTHER PUBLICATIONS

Japanese Office action; Application 2021-054703; Jul. 2, 2024.
Japanese office action; Application 2021-054703; Oct. 22, 2024.

*Primary Examiner* — Quochien B Vuong
(74) *Attorney, Agent, or Firm* — Duft & Bornsen, PC

(57) ABSTRACT

A setting apparatus includes: a CPU and a memory connected to the CPU. The memory is configured to store information regarding each of a plurality of users individually using a single space. The CPU is configured to perform: identifying a user to use the space; authenticating the user identified in the identifying; setting devices provided in the space based on the information stored in the memory. The information stored in the memory includes: first information; and second information given stricter restriction than the first information. The CPU is configured to perform: the setting including performing a predetermined setting of the devices provided in the space based on the first information of the user identified in the identifying.

11 Claims, 6 Drawing Sheets

(56) References Cited

U.S. PATENT DOCUMENTS

2006/0227066 A1* 10/2006 Hu .................... G06F 3/04883
  345/7
2019/0265868 A1  8/2019 Penilla et al.
2020/0180533 A1* 6/2020 Sakurada ................ H04W 4/40

* cited by examiner

SETTING APPARATUS

CROSS-REFERENCE TO RELATED APPLICATION

This application is based upon and claims the benefit of priority from Japanese Patent Application No. 2021-054703 filed on Mar. 29, 2021, the content of which is incorporated herein by reference.

BACKGROUND OF THE INVENTION

Field of the Invention

This invention relates to a setting apparatus configured to set devices provided, for example, in a car, and used by users.

Description of the Related Art

There are conventional devices that change the seat position of the driver's seat installed in a car for each user. In addition, some mobile phone display devices are known to change the display mode when being lent to a third party (for example, see JP 2015-088837 A). In the device described in JP 2015-088837 A, a transition from the currently displayed screen which is requested in a third-party mode triggers a shift to a security lock mode in which the activation and display of a new application are disabled.

Regarding devices that are used by a plurality of users such as devices installed in cars, it may be preferable in some cases to change the settings of devices for each user according to the setting content. However, the display device described in JP 2015-088837 A is not intended to change settings for different users who use the same device; therefore, it is difficult to reflect user-specific personal settings of a plurality of users at appropriate timings.

SUMMARY OF THE INVENTION

An aspect of the present invention is a setting apparatus, including: a CPU and a memory connected to the CPU. The memory is configured to store information regarding each of a plurality of users individually using a single space. The CPU is configured to perform: identifying a user to use the space; authenticating the user identified in the identifying; setting devices provided in the space based on the information stored in the memory. The information stored in the memory includes: first information; and second information given stricter restriction than the first information. The CPU is configured to perform: the setting including performing a predetermined setting of the devices provided in the space based on the first information of the user identified in the identifying.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
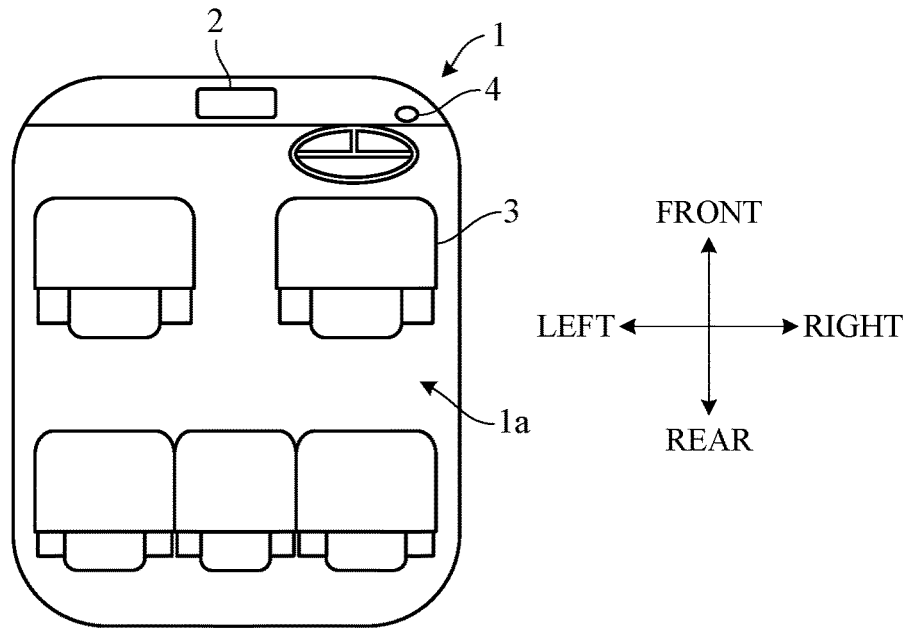
FIG. 1 is a diagram illustrating an example of a car interior space to which a setting apparatus according to an embodiment of the present invention is applied.

Hereinafter, an embodiment of the present invention will be described with reference to FIGS. 1 to 10. FIG. 1 is a diagram illustrating a space to which a setting apparatus 10 according to an embodiment of the present invention is applied, which is exemplified here by a car interior space 1a of a car 1 that is individually used by a plurality of users, such as a shared car for car sharing. As illustrated in FIG. 1, the car interior space 1a is equipped with devices such as a display 2 for displaying a navigation screen and the like, an electric driver's seat 3 whose front-rear position and/or height can be adjusted, and an air conditioner. It is troublesome for a user who repeatedly uses this kind of car interior space 1a to adjust the settings of each device according to their preferences every time the user uses the car interior space 1a. Therefore, it is preferable from the viewpoint of convenience to automatically reflect user-specific personal settings.

However, if the user's personal information such as the travel history of the car 1, home address, and personal messages received via the in-car communication device is automatically displayed on the display 2, the user may find it convenient but also unfavorable in some cases. For example, if the user's personal information is automatically displayed on the display 2 while any other user is using the car 1 or in the presence of a passenger, the user would find it rather unfavorable. In view of this, in the present embodiment, the setting apparatus is configured as follows to reflect user-specific personal settings at appropriate timings, so that user convenience can be improved and privacy can be protected.

Figure 2:
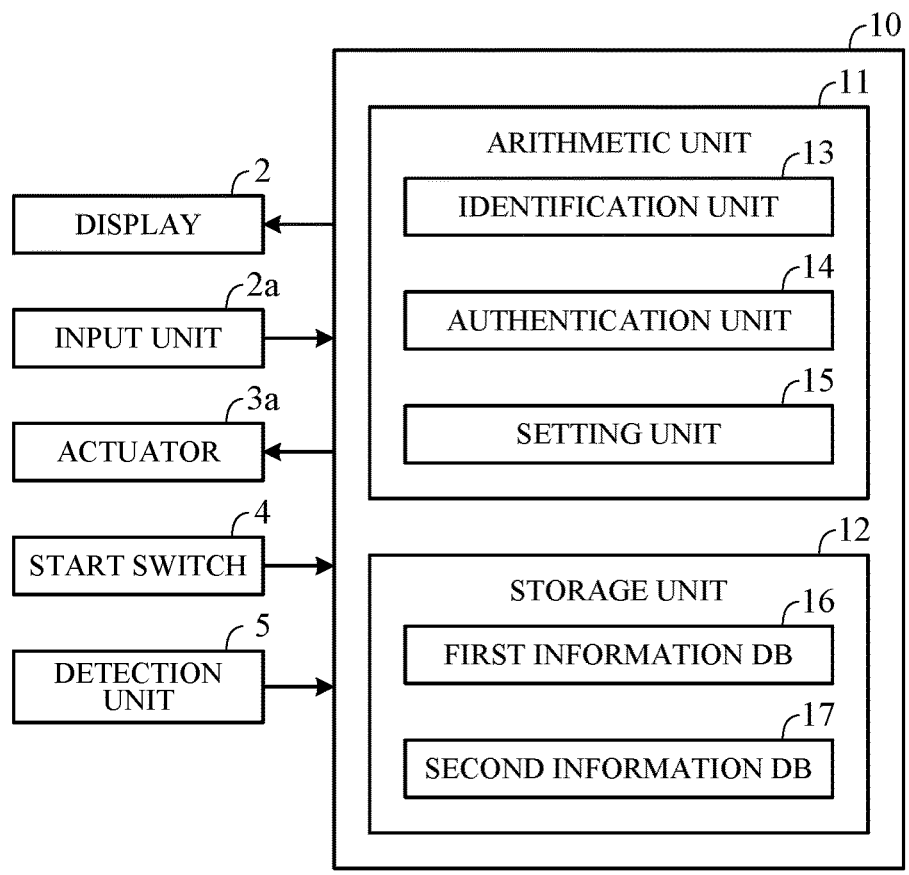
FIG. 2 is a block diagram illustrating an example of main configuration of the setting apparatus.

FIG. 2 is a block diagram illustrating the configuration of the main part of the setting apparatus 10. As illustrated in FIG. 2, the setting apparatus 10 includes a computer having an arithmetic unit 11 such as a CPU, a storage unit 12 which is a memory such as a ROM and/or a RAM, and peripheral circuits thereof. The arithmetic unit 11 includes an identification unit 13, an authentication unit 14, and a setting unit 15 as functional components, and the storage unit 12 includes a first information database (hereinafter referred to as DB) 16 and a second information DB 17 as functional components. That is, the CPU of the setting apparatus 10 functions as the identification unit 13, the authentication unit 14, and the setting unit 15, and the memory such as the ROM and/or the RAM of the setting apparatus 10 functions as the first information DB 16 and the second information DB 17.

The setting apparatus 10 is connected to the display 2 provided in the car interior space 1a, an input unit 2a such as a touch panel provided on the display 2, and an actuator 3a that drives various devices such as the position adjustment mechanism of the driver's seat 3 and the air conditioner. The setting apparatus 10 is also connected to a start switch 4 such as an ignition switch that supplies power to in-car devices including the actuator 3a and activates the car 1, and a detection unit 5 such as a seat sensor and/or an in-car camera that detects the number of occupants. Note that the detection unit 5 may be configured to detect only whether the number of occupants is a predetermined number or more, for example, detect only the presence or absence of a passenger.

The storage unit 12 stores information of user-specific personal settings. The first information DB 16 stores first information, whose availability to other users is not restricted, and the second information DB 17 stores second information, whose availability to other users is restricted. The first information includes setting information that is not related to personal information of the user, such as the brightness of the display 2, the position of the driver's seat 3, and the air volume and temperature of the air conditioner. The second information includes setting information necessary for causing the display 2 to show personal information of the user such as the travel history of the car 1 during the past use by the user, the user's home address, and personal messages to the user received via the in-car communication device.

The identification unit 13 identifies the user who uses the car interior space 1a as the driver this time from among the users who use the car interior space 1a, more specifically, from among the users registered in advance. For example, user names registered in advance are displayed on the display 2 in conjunction with the opening and closing of the driver's side door of the car 1 so as to seek confirmation from the user.

Figure 3:
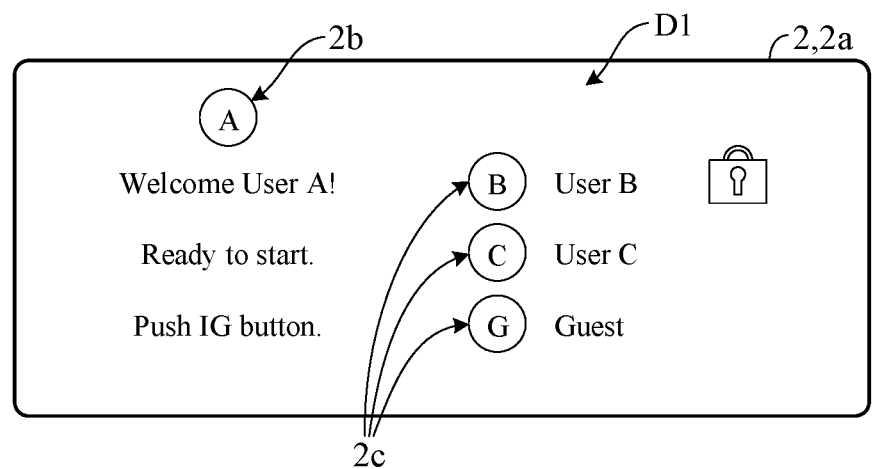
FIG. 3 is a diagram illustrating an example of a user identification screen displayed on a display of FIGS. 1 and 2.

FIG. 3 is a diagram illustrating a user identification screen D1 displayed on the display 2. As illustrated in FIG. 3, the user identification screen D1 displays the user name of the user A who used the car 1 last time, that is, in the latest drive cycle, and displays a button image 2b for confirming that the current user is the same as the last user through the touch panel (input unit 2a). In addition, a button image 2c is displayed for designating another registered user B/C or a guest user. The guest user is a user account whose second information is not registered, and for which user authentication (described later) is not performed after designation.

The identification unit 13 identifies the user confirmed or designated through the button image 2b or 2c as the user who uses the car interior space 1a this time. In the case where the guest user is designated through the button image 2c or none of the users is designated, the identification unit 13 identifies the last user as the current user without change. In the case where the registered personal information related to the user identified by the identification unit 13 contains second information, whose availability to other users is restricted, the display 2 transitions to an authentication screen for authenticating the user.

Figure 4:
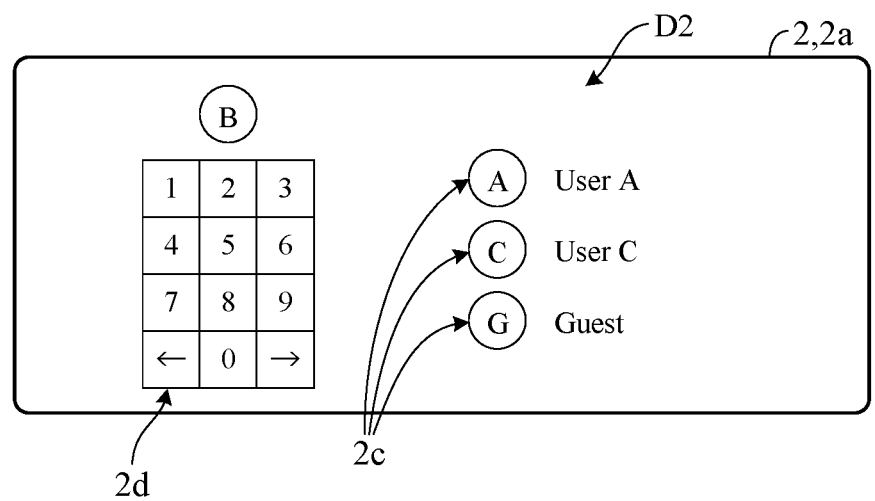
FIG. 4 is a diagram illustrating an example of a user authentication screen displayed on the display of FIGS. 1 and 2.
Figure 5:
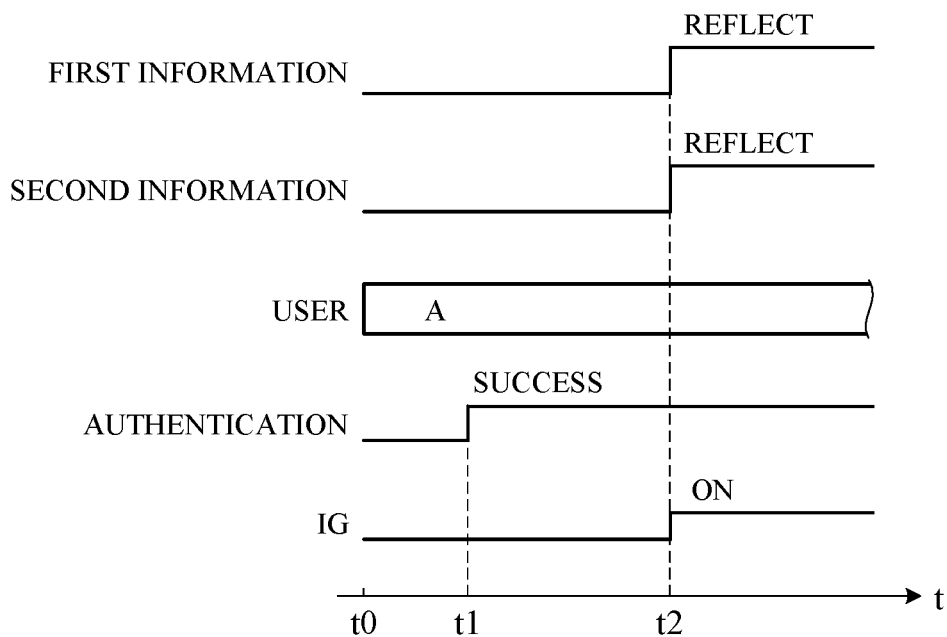
FIG. 5 is a time chart for explaining operation of the setting apparatus in a case where a user same as the last time is authenticated before activation of the car.

FIG. 4 is a diagram illustrating a user authentication screen D2 displayed on the display 2, which is the screen for authenticating the user B to which the display 2 transitions when the user B whose second information has been registered is designated on the user identification screen D1 of FIG. 3. As illustrated in FIG. 4, the user authentication screen D2 displays the user name of the user B identified by the identification unit 13, and also displays a numeric keypad image 2d for entry of authentication information (for example, PIN). The authentication unit 14 displays the user authentication screen D2 on the display 2 so as to seek entry of authentication information from the user, and authenticates the user identified by the identification unit 13 based on the authentication information entered through the input unit 2a.

Regardless of the success or failure of the user authentication by the authentication unit 14, once the start switch 4 of the car 1 is turned on, the setting unit 15 configures settings such as the brightness of the display 2, the position of the driver's seat 3, and the air volume and temperature of the air conditioner based on the first information of the user identified by the identification unit 13. In the case where the user authentication by the authentication unit 14 has succeeded, the setting unit 15 configures settings necessary for causing the display 2 to show the travel history of the car 1, the address of the user's home, personal messages to the user received via the in-car communication device, and the like based on the second information of the authenticated user.

Note that each user can register, as their second information, personal settings for changing the range of information permitted to be displayed on the display 2 according to the presence or absence of a passenger. For example, it is possible to register a personal setting that does not allow the display 2 to show personal messages in the presence of a passenger. In this case, when two or more occupants are detected by the detection unit 5, the setting unit 15 configures settings based only on the first information of the user identified by the identification unit 13, regardless of the success or failure of the user authentication by the authentication unit 14.

FIGS. 5 to 9 are time charts for explaining the operation of the setting apparatus 10. Consider the case illustrated in FIG. 5 where the user A who is the same as the last user is authenticated before the activation of the car. Once the driver's side door of the car 1 in the non-activated state is opened at time t0, the user identification screen D1 (FIG. 3) for identifying the user A who used the car interior space 1a last time is displayed on the display 2. Thereafter, it is confirmed on the user identification screen D1 that the user who uses the car interior space 1a this time is the user A again, and then the user authentication screen D2 (FIG. 4) is displayed. Subsequently, the authentication of the user A succeeds at time t1 before the activation of the car 1, and the car 1 is activated at time t2. Then, the first information and the second information of the user A are reflected. In this way, in the case where the user authentication is completed before the activation of the car 1, every personal setting is automatically reflected as soon as the car 1 is activated, which is highly convenient for the user.

Figure 6:
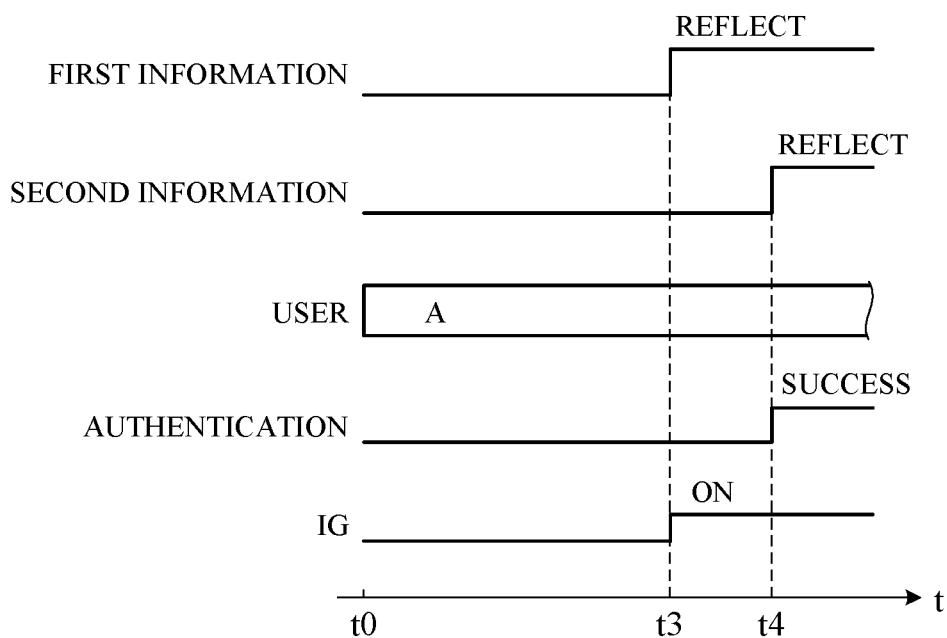
FIG. 6 is a time chart for explaining operation of the setting apparatus in a case where the user same as the last time is authenticated after the activation of the car.

FIG. 6 shows a case where the user A who is the same as the last user is authenticated after the activation of the car 1. In the case where the authentication of the user A does not succeed before the activation of the car 1 as illustrated in FIG. 6, only the first information of the user A is reflected when the car 1 is activated at time t3. Even in this case, user convenience is secured because some settings such as the position of the driver's seat 3 are automatically reflected as soon as the car 1 is activated. Thereafter, once the authentication of the user A succeeds at time t4 after the activation of the car 1, the second information of the user A is additionally reflected. In this way, even in the case where the user authentication is completed after the activation of the car 1, a certain level of convenience is secured while the privacy of the user is protected.

Figure 7:
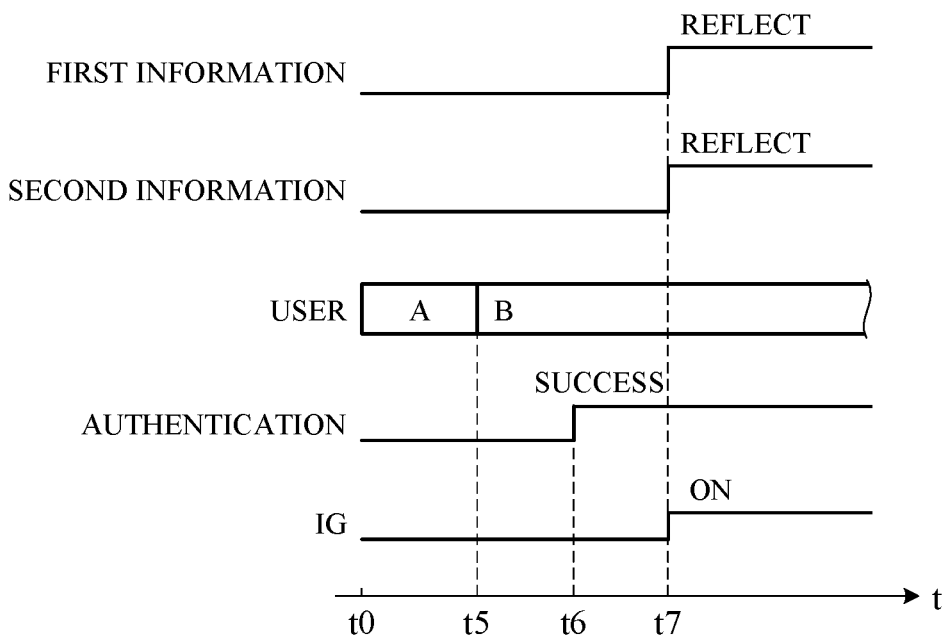
FIG. 7 is a time chart for explaining operation of the setting apparatus in a case where the user is changed and authenticated before the activation of the car.

FIG. 7 shows a case where the user is changed and authenticated before the activation of the car 1. As illustrated in FIG. 7, the user B different from the last user is designated at time t5 before the activation of the car 1, and the authentication of the user B succeeds at time t6. Then, once the car 1 is activated at time t7, the first information and the second information of the user B are reflected. In this way, in the case where the user is changed but the user authentication is completed before the activation of the car 1, every personal setting is reflected as soon as the car 1 is activated, which is highly convenient for the user.

Figure 8:
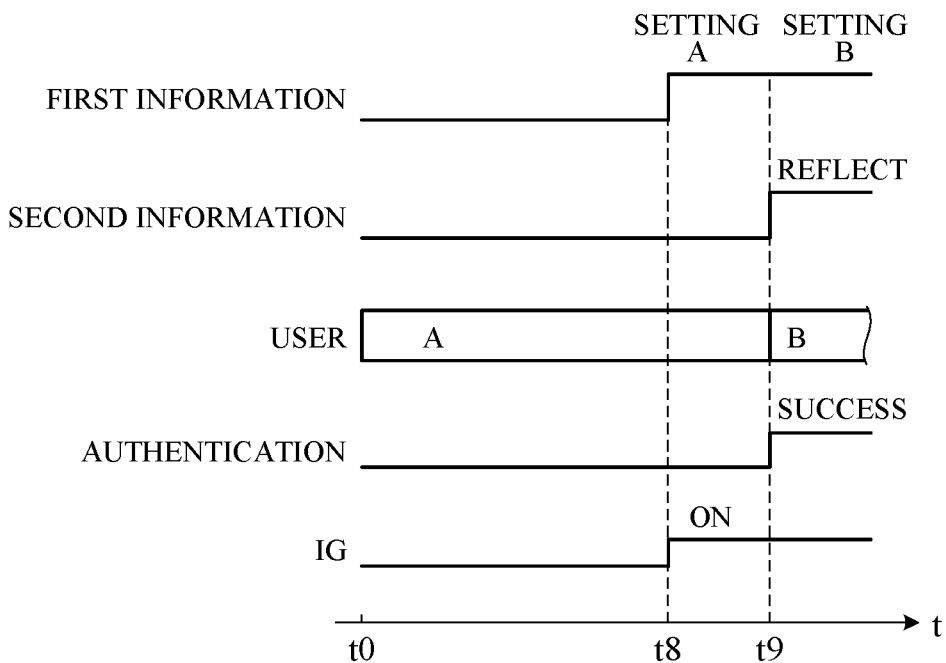
FIG. 8 is a time chart for explaining operation of the setting apparatus in a case where the user is changed and authenticated after the activation of the car.

FIG. 8 shows a case where the user is changed and authenticated after the activation of the car 1. In the case where the user authentication does not succeed before the activation of the car 1 as illustrated in FIG. 8, only the first information of the user A who used the car interior space 1a last time is reflected at time t8 when the car 1 is activated, in the same manner as in FIG. 6. Thereafter, once the user B different from the last user is designated and the authentication of the user B succeeds at time t9, the first information of the user B is reflected instead of the first information of the user A, and the second information of the user B is reflected. This example may apply to a situation where a user different from the last user gets in the car 1 but does not perform a user change operation, in which case the second information of the last user is prevented from being automatically reflected in conjunction with the activation of the car 1, and the privacy of the user is protected.

Figure 9:
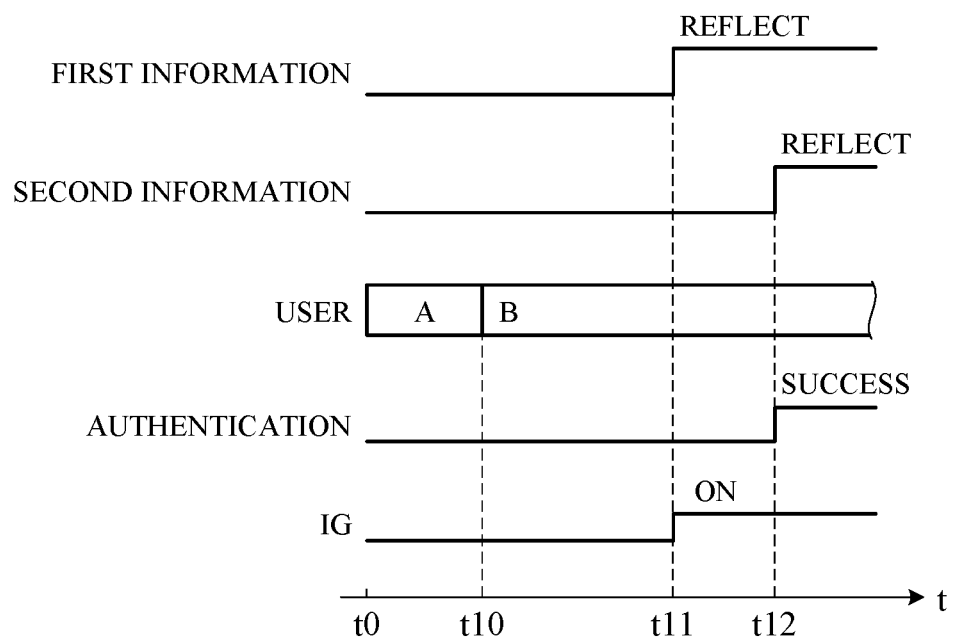
FIG. 9 is a time chart for explaining operation of the setting apparatus in a case where the user is changed before the activation of the car and is authenticated after the activation of the car.

FIG. 9 shows a case where the user is changed before the activation of the car 1 and is authenticated after the activation of the car 1. In the case where the user B different from the last user is designated at time t10 but the user authentication does not succeed as illustrated in FIG. 9, only the first information of the user B is reflected at time t11 when the car 1 is activated. Even in this case, user convenience is secured because some settings such as the position of the driver's seat 3 are automatically reflected as soon as the car 1 is activated. Thereafter, once the user authentication succeeds at time t12, the second information of the user B is additionally reflected. In this way, even in the case where the user authentication is not completed at the time of activation of the car 1, user convenience is secured because the first information of the newly identified user B is reflected.

In cases where each user does not want to make their second information reflected, they may designate the guest user on the user identification screen D1, or may designate their user name on the user identification screen D1 and thereafter leave the user authentication screen D2 without entering the authentication information. Alternatively, the user may designate their user name on the user identification screen D1 and thereafter designate the guest user. This makes it possible to reflect only the first information of the user.

Figure 10:
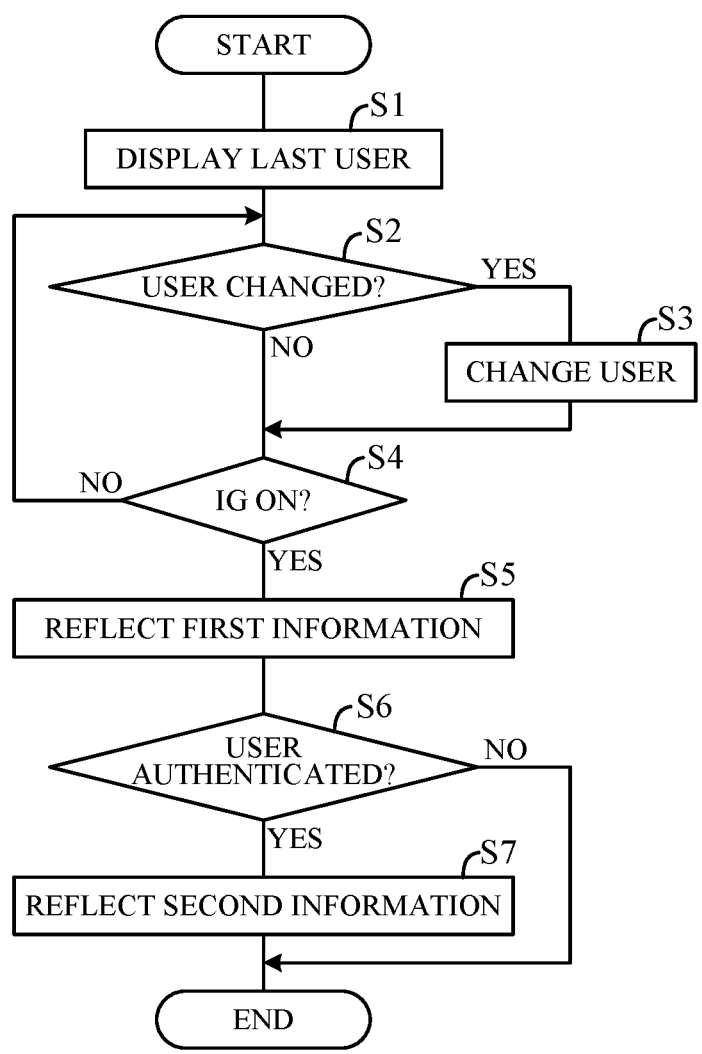
FIG. 10 is a flowchart illustrating a procedure for processing by an arithmetic unit of FIG. 2.

FIG. 10 is a flowchart illustrating a procedure for processing by the arithmetic unit 11 of the setting apparatus 10. The processing illustrated in the flowchart is started, for example, when the driver's side door of the car 1 in the non-activated state is opened. First, in processing step (hereinafter denoted by S) S1, the user identification screen D1 (FIG. 3) is displayed on the display 2, and the user who used the car interior space 1a last time is identified. Next, it is determined in S2 whether the user has been changed through the input unit 2a. In response to confirming the change of the user in S2, the new user is identified in S3 and the processing proceeds to S4; otherwise the last user remains identified and the processing proceeds to S4. In S4, it is determined whether the ignition switch (start switch 4) has been turned on to activate the car 1. In response to determining that the ignition switch is on in S4, the processing proceeds to S5; otherwise the processing returns to S2.

In S5, settings are configured for the devices provided in the car interior space 1a based on the first information of the user identified in S1 or S3. Next, it is determined in S6 whether the user authentication has succeeded. In response to confirming the success of the user authentication in S6, settings are configured for the devices provided in the car interior space 1a based on the second information of the user identified in S1 or S3, and the processing is ended; otherwise the processing is ended without reflecting the second information.

In other words, settings that are not related to personal information such as the position of the driver's seat 3 are automatically reflected in conjunction with the activation of the car 1 (S4, S5). On the other hand, settings related to personal information such as the display of personal messages are not automatically reflected in conjunction with the activation of the car 1 (S6, S7). In this way, user-specific personal settings are reflected at appropriate timings according to the degree of restriction on the availability to other users, so that user convenience can be improved and privacy can be protected.

The present embodiment can achieve advantageous effects as follows.

(1) The setting apparatus 10 includes the storage unit 12 configured to store information regarding each of a plurality of users individually using the single car interior space 1a, the identification unit 13 configured to identify a user to use the car interior space 1a, the authentication unit 14 configured to authenticate the user identified by the identification unit 13, and the setting unit 15 configured to set devices provided in the car interior space 1a based on the information stored in the storage unit 12 (FIGS. 1 and 2). The information stored in the storage unit 12 includes first information and second information given stricter restriction than the first information (FIG. 2). When the user is identified by the identification unit 13, the setting unit 15 performs a setting of the devices provided in the car interior space 1a based on the first information of the user identified by the identification unit 13 stored in the storage unit 12 (S1 to S5 in FIG. 10). Consequently, user-specific personal settings can be reflected at appropriate timings according to the degree of restriction, so that user convenience can be improved and privacy can be protected.

(2) When the user is authenticated by the authentication unit 14, the setting unit 15 performs a setting of the devices provided in the car interior space 1a based on the second information of the user authenticated by the authentication unit 14 stored in the storage unit 12 (S6 to S7 in FIG. 10). That is, after the user is authenticated, device settings are automatically configured by additionally reflecting the second information having a higher degree of restriction, so that convenience for the user can be further improved.

(3) After the setting unit 15 performs a setting of the devices provided in the car interior space 1a based on the first information of the identified user, when the user is authenticated, the setting unit 15 performs a setting of the devices provided in the car interior space 1a based on the second information of the authenticated user (S5 to S7 in FIG. 10). Therefore, the second information of the user is prevented from being automatically reflected without user authentication in conjunction with the activation of the car 1, for example, and the privacy of the user can be reliably protected.

(4) On the condition that the start switch 4 of the car 1 is turned on, when the user is identified by the identification unit 13, the setting unit 15 performs a setting of the devices provided in the car interior space 1a based on the first information of the user identified by the identification unit 13 stored in the storage unit 12 (S4 to S5 in FIG. 10). That is, regardless of the success or failure of the user authentication, the first information having a lower degree of restriction is automatically reflected in conjunction with the activation of the car 1, so that convenience for the user can be secured.

(5) The first information is information other than information regarding personal information of each of the plurality of users, and the second information is information regarding personal information of each of the plurality of users. That is, personal information of each user such as history information and home address, personal messages, and the like are managed as the second information, which is prevented from being disclosed to others through display on the display 2 or any other means without user authentication, and thus the privacy of the user is protected.

(6) The first information includes information regarding settings for the driver's seat 3, the air conditioner, and the display 2 provided in the car 1, and the second information includes information regarding settings for displaying the destination history of the car 1, address, and personal messages on the display 2. Thus, the settings of the various devices provided in the car interior space 1a are classified as those related to the personal information of the users and those not related to the personal information of the users, which are reflected at appropriate timings. Therefore, the convenience of the users of the car 1 can be improved and privacy can be protected.

(7) The setting apparatus 10 further includes the input unit 2a configured to input designation of a specific user from among the plurality of users or a guest user other than the plurality of users (FIGS. 3 and 4). The identification unit 13 identifies a user who used the car interior space 1a last time as the user to use the car interior space 1a this time before the user to use the car interior space 1a is designated through the input unit 2a or after the guest user is designated through the input unit 2a. Consequently, regardless of the success or failure of the user authentication, one of the users is identified and their first information is automatically reflected, so that user convenience can be secured.

(8) The setting apparatus 10 further includes the input unit 2a configured to input designation of a guest user other than the plurality of users (FIGS. 3 and 4). The setting unit 15 performs a setting of the devices provided in the car interior space 1a based on the first information of a user who used the car interior space 1a last time when the guest user is designated through the input unit 2a. Only the first information of the user themselves or the last user is reflected by designating the guest user, so that user convenience can be secured.

(9) The setting apparatus 10 further includes the detection unit 5 configured to detect the number of people in the car interior space 1a (FIG. 2). The setting unit 15 performs a setting of the devices provided in the car interior space 1a based on the first information of a user who used the car interior space 1a last time when the guest user is designated through the input unit 2a and two or more people are detected by the detection unit 5. This may apply to the case of consecutive uses of the car interior space 1a by the same user: in the presence of a passenger, if the second information is automatically reflected and personal information such as messages is displayed on the display 2, the user would find it rather unfavorable. It is possible to appropriately protect the privacy of the user by reflecting only the first information of the user themselves as the last user when the guest user is designated and one or more passengers are detected.

(10) The setting apparatus 10 further includes the detection unit 5 configured to detect the number of people in the car interior space 1a (FIG. 2). When two or more people are detected by the detection unit 5, the setting unit 15 performs a setting of the devices provided in the car interior space 1a based on the first information of the user identified by the identification unit 13 stored in the storage unit 12, regardless of whether the user has been authenticated by the authentication unit 14. For example, a personal setting that does not allow the display 2 to show personal messages in the presence of a passenger in the car interior space 1a is managed as the second information, so that the privacy of the user can be further protected.

In the above embodiment, the devices used by users are exemplified in FIG. 1 and elsewhere by the display 2, the driver's seat, and the like. However, the devices in the space are not limited thereto. For example, the devices may include the rearview mirror and/or side-view mirrors whose angle is adjustable via an operation unit provided in the car interior space 1a.

The above embodiment has described the example of setting the driver's seat 3 and the display content of the display 2 provided in the car interior space 1a. However, a single space individually used by a plurality of users is not limited to the car interior space. For example, a single space may be an audiovisual room individually used by a plurality of users. In this case, the first information can be setting information such as the brightness of the display(s) provided in the audiovisual room and the sound field of the speaker(s), and the second information can be setting information related to the display of audiovisual history on the display (s). Alternatively, a single space may be an office space individually used by a plurality of users. In this case, the first information can be setting information such as the settings of the air conditioning device(s) provided in the office space and the display settings of the computer(s), and the second information can be setting information related to the files accessible by the computer(s).

The above embodiment has described the example in which the settings not related to the personal information of the users and the settings related to the personal information are configured in stages. However, the first information and the second information with restriction are not limited thereto, and may be information related to confidential information, for example.

The above embodiment has described the example in which the user confirmed or designated through the button image 2b or 2c is identified as the user who uses the car interior space 1a this time with reference to FIG. 3 and elsewhere. However, the identification of the user is not limited thereto. For example, the face of the person who opens the driver's side door may be recognized using a camera provided in the car, and the user corresponding to the recognition result may be identified from among the users registered in advance based on the recognized gender, age, and the like. The above embodiment has described the example in which the user is authenticated based on the PIN entered through the touch panel (input unit 2a). However, the user authentication is not limited thereto. For example, face authentication and/or iris authentication may be performed using a camera provided in the car, or other types of authentication such as fingerprint authentication, palm print authentication, and finger vein authentication may be performed using a sensor provided on the steering wheel. Voice authentication may be performed using a microphone provided in the car.

The above embodiment can be combined as desired with one or more of the above modifications. The modifications can also be combined with one another.

According to the present invention, it is possible to reflect user-specific personal settings at appropriate timings.

Above, while the present invention has been described with reference to the preferred embodiments thereof, it will be understood, by those skilled in the art, that various changes and modifications may be made thereto without departing from the scope of the appended claims.

What is claimed is:

1. A setting apparatus, comprising:
a CPU and a memory connected to the CPU, wherein
the memory is configured to store information regarding each of a plurality of users individually using a single space, wherein
the CPU is configured to perform:
identifying a user to use the space;
authenticating the user identified in the identifying;
setting devices provided in the space based on the information stored in the memory, wherein
the information stored in the memory includes: first information; and second information given stricter restriction than the first information, wherein
the CPU is configured to perform:
the setting including performing a predetermined setting of the devices provided in the space based on the first information of the user identified in the identifying.

2. The setting apparatus according to claim 1, wherein the predetermined setting is a first setting, wherein
the CPU is configured to perform:
the setting including performing a second setting of the devices provided in the space based on the second information of the user authenticated in the authenticating.

3. The setting apparatus according to claim 2, wherein the CPU is configured to perform:
the setting including performing the second setting after performing the first setting.

4. The setting apparatus according to claim 1, wherein the space is a cavity space in a car, wherein
the CPU is configured to perform:
the setting including performing the first setting on a condition that a start switch of the car is turned on.

5. The setting apparatus according to claim 1, wherein the first information is information other than information regarding personal information of each of the plurality of users, wherein
the second information is information regarding personal information of each of the plurality of users.

6. The setting apparatus according to claim 5, wherein the space is a cavity space in a car, wherein
the first information includes information regarding settings for a driver's seat, an air conditioner, and a display provided in the cavity space, wherein
the second information includes information regarding settings for displaying a destination history of the car, address, and personal messages on the display.

7. The setting apparatus according to claim 1, further comprising:
an input unit configured to input designation of a specific user from among the plurality of users or a guest user other than the plurality of users, wherein
the CPU is configured to perform:
the identifying including identifying a user who used the space last time as the user to use the space this time before the user to use the space is designated through the input unit or after the guest user is designated through the input unit.

8. The setting apparatus according to claim 1, further comprising:
an input unit configured to input designation of a guest user other than the plurality of users, wherein
the CPU is configured to perform:
the setting including setting the predetermined setting based on the first information of a user who used the space last time when the guest user is designated through the input unit.

9. The setting apparatus according to claim 7, further comprising:
a detector configured to detect a number of people in the space, wherein
the CPU is configured to perform:
the setting including performing the predetermined setting based on the first information of a user who used the space last time when the guest user is designated through the input unit and two or more people are detected by the detector.

10. The setting apparatus according to claim 1, further comprising:
a detector configured to detect a number of people in the space, wherein
the CPU is configured to perform:
the setting including performing the predetermined setting regardless of whether the user has been authenticated, when two or more people are detected by the detector.

11. The setting apparatus according to claim 1, further comprising:
an input unit configured to input authentication information; and
a display, wherein
the CPU is configured to perform:
controlling the display to display an authentication screen for prompting the user identified in the identifying to input authentication information.

* * * * *